INVENTOR
Hannibal C. Ford
BY
HIS ATTORNEY

Patented Sept. 9, 1947

2,427,130

UNITED STATES PATENT OFFICE 2,427,130

LEVEL GYRO

Hannibal C. Ford, Great Neck, N. Y., assignor to Ford Instrument Company, Inc., Long Island City, N. Y., a corporation of New York Application July 7, 1937, Serial No. 152,357

16 Claims. (Cl. 74—5)

The invention herein disclosed relates to a vertical-seeking gyroscopic construction that may be used as an artificial horizon on a moving ship, that is suitable for providing a reference for the vertical and horizontal, and that may be used for stabilizing an element and for measuring angular roll and pitch of a ship.

It is a well known fact that a freely mounted, or neutral, gyroscope, unless acted upon by external forces, remains stationary in space, that is, its spin axis remains parallel with its original position as the gyroscope is moved in space by the rotation of the earth and the movement of the ship on which it is mounted. Consequently, in order to maintain a gyroscope with its spin axis vertical, it is necessary to apply precessional forces to compensate for the rotation of the earth and the movement of the ship upon which the gyroscope is mounted. In addition, it is a practical impossibility to construct a gyroscope so balanced that there are no precessional forces acting on the gyroscope as a result of variations in bearing friction which forces cause the gyroscope to depart from its original position and such forces must be compensated by applied precessional forces in order to maintain the spin axis of the gyroscope vertical.

A vertical-seeking or level gyroscope of this type is especially useful for providing a stable plane or an artificial horizon on a ship. Heretofore, a neutral gyroscope has been used for maintaining a horizontal plane on a ship to form a basis for measuring the roll and cross roll of the ship. However, it has been necessary to manually apply precessional forces in order to maintain the spin axis of the gyroscope vertical. These forces have been periodically applied to the gyroscope in accordance with the observed deviation of mutually perpendicular lines of sight from the horizon.

In the copending application of Hannibal C. Ford and Elliott P. Ross, Serial No. 152,358, filed July 7, 1937, there is disclosed a control for a gyroscope acting through the force of gravity and operative to provide a vertical-seeking force sufficient to overcome variations in bearing friction and to effect a rapid and accurate settling of the gyroscope on the true vertical upon starting the gyroscope and whenever the gyroscope is accidentally displaced from the true vertical. Forces are generated and electrically applied to compensate for such forces as act upon the gravity control by virtue of horizontal accelerations. Similarly, forces are generated and electrically applied to compensate for the rotation of the earth.

In accordance with this invention there is provided a fully compensated level or vertical-seeking gyroscope. Specifically, there is provided a gyroscopic mechanism in which the factors tending to cause the gyroscope to depart from the true vertical are measured and compensating forces are applied to the gyroscope. The compensating forces are applied hydraulically to compensate for the forces acting upon the gravity controls and to effect precession of the gyroscope in accordance with the rotation of the earth and the movement over the earth of the ship on which the gyroscope is mounted.

A follow-up mechanism controlled by the gyroscope is utilized to stabilize the gyroscope support and to transmit movement to stabilize any other object. This follow-up mechanism is such that it is actuated by relative movement of the gyroscope with respect to its support about two mutually perpendicular axes and it does not place any reactive force upon the gyroscope A vertical-seeking gyroscopic mechanism having these characteristics and embodying this invention is illustrated in the accompanying drawings in which:

Fig. 2a is a diagrammatic representation of a supplemental force generating mechanism;

General description

Figure 1:
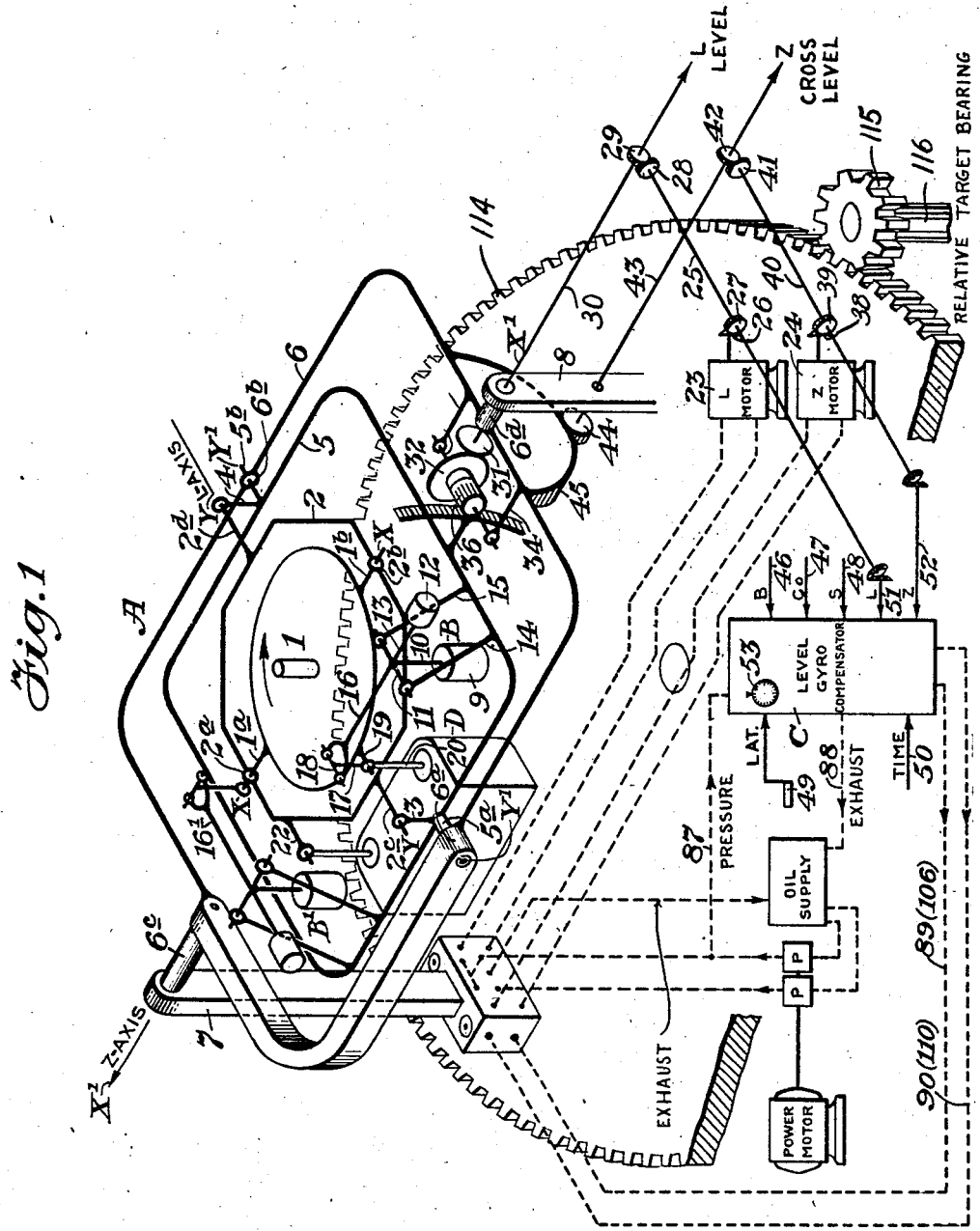
Fig. 1 is a diagrammatic illustration of the gyroscopic mechanism.

In general, the gyroscopic mechanism illustrated in the drawings includes a gyroscopic system A; a pair of sensitive pendulums B and B' for applying precessional forces about mutually prependicular axes of the gyroscope; and a computer and force generator C in which there is provided mechanism for computing and generating forces proportional to the various horizontal accelerations acting on the pendulums, to the speed of the ship and to the movement of the earth, and for resolving such forces into components about the level and cross level axes, that is, about the L-axis and the Z-axis. The various forces generated in the computer C are generated as hydraulic pressures and are so applied to the gyroscope through a control block D mounted on the phantom of the sensitive gyroscopic system. The block D also acts as a control block for the follow-up mechanism which is operated hydraulically.

The gyroscope

The gyroscope 1 is mounted with its spin axis vertical, the case of the gyroscope being mounted on a horizontal axis X—X through trunnions 1a and 1b journaled in bearings 2a and 2b formed in a sensitive gimbal 2. Trunnions 2c and 2d extending from the gimbal along an axis at right angles to the axis X—X are journaled in bearing standards 3 and 4 respectively extending vertically from the phantom ring 5. The gimbal is thus pivotally mounted about an axis Y—Y at right angles to the axis X—X. The phantom ring 5 is pivotally mounted within the frame 6, through trunnions 5a and 5b extending from the phantom ring and journaled in bearings 6a and 6b in the frame, for pivotal movement about an axis Y'—Y' parallel to the axis Y—Y. This system is supported by standards 7 and 8 extending from the platform 114 on which the gyroscope is mounted, or within the gun director support. This platform is adapted to be rotated by means of a pinion 115 engaging gear teeth on the periphery of the platform. Said pinion is fixed to a shaft 116 which may be operated in accordance with the relative target bearing the same as shaft 46. The frame 6 is pivotally mounted in the standards through trunnions 6c and 6d extending into and journaled in bearings of the axis X'—X' of the frame is perpendicular to the axis Y'—Y', and is parallel to the deck of the ship upon which the gyroscope is mounted.

As previously stated, the phantom ring 5 carries the sensitive pendulums B and B'. These pendulums are similarly constructed and mounted on the phantom ring, the pendulum B being mounted on one side of the phantom ring and the pendulum B' being mounted on another and adjacent side of the phantom ring so that the axes about which the pendulums are mounted are parallel to the Y—Y and X—X axis respectively. The pendulum B consists of a weight 9 on the end of a rod 10 extending from the longitudinal center of a shaft 11 and at right angles thereto. A smaller mass or counterbalance 12 on the end of a horizontal rod 13 extends from the longitudinal center of the shaft 11 and at right angles to the shaft 11 and the rod 10. The ends of the shaft 11 are journaled in bearing brackets 14 and 15 extending from the phantom ring. A forked arm 16, the weight of which is counterbalanced by the mass 12, extends from the shaft 11 and oppositely to the rod 13 and is connected to a rod 17 through a pin 18 journaled in the forked section of the arm 16. The rod 17 is connected to a pin 19 on the gyro case to which pin there is also connected a control element 20. The forked arm 16' of the pendulum B' is similarly connected to the trunnion 1a extending from the case of the gyroscope.

The pendulums so arranged apply torques about the X—X and Y—Y axes respectively, that is, about axes ninety degrees in advance of the pendulum axes in the plane of rotation of the gyroscope. By thus arranging the pendulums, the gyroscope is caused to precess about an axis parallel to the axis of the controlling pendulum. The pendulums may also be arranged, if desired, to apply the pendulic forces slightly more or less than ninety degrees from their axes for accelerating or retarding the precession of the gyroscope.

*Follow-up*

The phantom ring 5 is stabilized through a hydraulic follow-up system, the operation of which is controlled by two piston valves mounted in the control block D. The control element 20 is an extension of the valve rod of one of these piston valves, and a similar control element 21, connected to the gimbal ring 2 through a pin 22, is an extension of the valve rod of another piston valve. Hydraulic motors 23 and 24 are controlled by the control elements 21 and 20 respectively. The motor 23 upon operation moves the phantom ring about its axis Y'—Y', and the motor 24 actuates the frame 6 about the axis X'—X' and the phantom ring 5 is moved about the same axis through its connection with the frame.

For actuating the phantom ring about the Y'—Y' axis, the shaft of the motor 23 is geared to a shaft 25 through a bevel gear 26 mounted on the motor shaft and a bevel gear 27 mounted on the shaft 25 and meshing with the gear 26. A similar pair of bevel gears 28 and 29 meshing together and mounted on one end of the shaft 25 and a shaft 30 transmits rotary movement of the shaft 25 to the shaft 30. The shaft 30 extends through and is journaled in the trunnion 6d and has secured on the end thereof a bevel gear 31 which meshes with a bevel gear 32 mounted upon a shaft 33 journaled in bearing brackets 34 and 35 extending from the frame 6. The bevel gear 32 has formed integral therewith a pinion 36 that engages a segmental rack 37 secured to the side of the phantom ring adjacent to the standard 8.

A similar train of gears and shafts transmits motion of the shaft of the motor 24 to the frame 6. The shaft of the motor 24 carries a bevel gear 38 which meshes with a bevel gear 39 secured on a shaft 40. A bevel gear 41 on the end of the shaft 40 and meshing with a similar gear 42 secured on a shaft 43, transmits rotation of the shaft 40 to the shaft 43. The shaft 43 extends through and is journaled in the standard 8 at a point below the trunnion 6d. On the end of the shaft 43, there is secured a pinion 44 which meshes with a segmental spur gear 45 secured to the side of the frame 6 adjacent the standard 8 and at right angles to the axis X'—X'. The axis of the gear 45 is coincident with the axis X'—X', the pivoted axis of the frame 6.

It will be observed that upon relative movement between the gyroscope and the phantom about the axis X—X, the control element 20, and the valve within the control block D will be moved relative to the control block. Similarly, relative movement of the gyroscope relative to the phantom about the Y—Y axis effects movement of the control element 21 and the valve actuated thereby relative to the control block D. The details of the manner in which, and the mechanism by which such movement of these control elements effects the operation of the motors 23 and 24 to cause the phantom to follow exactly movement of the gyroscope relative to its support are fully disclosed in the co-pending application of Edward J. Poitras and James D. Tear, entitled Gyroscope precessor and follow-up, filed April 11, 1939, Serial No. 267,248, and forms no part of this invention, as other follow-up systems, well known in the art, may likewise be used for this purpose.

*The computer*

The computer calculates and generates forces to counteract the forces due to horizontal accelerations acting through the pendulums, and precessional forces proportional to the movement of the ship and the rotation of the earth. These forces are resolved into components about the X—X and Y—Y axes and they are transmitted to the control block D and applied to the gyroscope hydraulically through the control elements 20 and 21 (the details of the hydraulic transmission and application of precessing forces to a gyroscope are illustrated and described in the aforementioned application of Edward J. Poitras and James D. Tear). The pendulums are, therefore, ineffective except when for any reason the gyroscope has departed from the true vertical, and when this occurs, the force of gravity acts proportional to the displacement to restore the gyroscope to the vertical. With torques applied in this manner, the gyroscope is aperiodic and approaches the vertical at a rate proportional to the displacement. By proper choice of pendulum the time rate of settling for any particular displacement may be chosen.

The computer utilizes, as factors in calibrating and generating the several forces mentioned above, the target bearing angle relative to the ship which is inserted by a shaft 46, the ship's course angle, inserted by a shaft 47, ship's speed, inserted by a shaft 48, latitude, inserted manually through a crank 49, and time, taken from a constant speed motor and inserted by a shaft 50. For certain installations, the level and cross level angles are also inserted through shafts 51 and 52 respectively. The relative target bearing (i. e., with respect to the ship) is obtained from the training gear of the director; the ship's course is obtained from the ship's compass; the ship's speed is obtained from the ship's log, provision for hand or automatic setting being provided; and the latitude is as stated inserted manually, a dial 53 being provided to indicate the latitude inserted in the computer.

The time, derived from a constant speed motor, is utilized to drive the disk 54a of a two ball integrator 54 of a type well known in the art such as shown in United States Patent No. 1,317,915 dated March 13, 1916. The carriage 54b of the integrator is shifted in accordance with the ship's speed $S_0$ and the driven element 54c is thus actuated or rotated at a speed proportional to the ship's movement. The angle turned through by the shaft 55 is thus proportional to $\int S_0 dt$, or the distance traveled by the ship. This rotational movement is transmitted through a shaft 55, a pair of bevel gears 55a and a differential 56 to a single ball component integrator 57 of a well known type such as illustrated in United States Patent No. 1,926,279, dated September 12, 1933. The rotational movement of shaft 55 drives the center or spider of the differential and one side of the differential is connected to a gear 58 on the end of the shaft through which the ship's course angle $C_0$ is inserted into the computer. The other side of the differential meshes with a gear 57a on the end of a vertical shaft 57b that rotates a gear 57c.

The gear 57c engages a gear 57d rotatably mounted on a horizontal shaft 57e supported on spaced standards 57f and 57g extending from a rotatably mounted plate 57h that is rotated or positioned in accordance with the ship's course angle by a gear engagement with the gear 58. The purpose of the differential 56 is to prevent rotation of gear 57d due to rotation of plate 57h. Connected to the gear 57d through a hub 57i, there is a drive disk 57j which drives the ball 57k of the component integrator. The position of the plate 57h thus determines the axis about which the ball 57k is driven. A disk 57l mounted on a shaft 59 and a similar disk 57m with its axis at ninety degrees from the axis of the disk 57l and mounted on a shaft 60 are driven by the ball 57k.

By the rotation of the plate 57h through its connection with the gear 58, the driving roller or disk 57j is displaced by the angle $C_0$ from the driven roller 57l. The driven roller or disk 57l is thus caused to rotate at a speed $S_N = S_0 \cos C_0$, and the driven disk 57m is caused to rotate at a speed $S_E = S_0 \sin C_0$. These represent the components of the ship's speed in the north and south direction ($S_N$) and in the east and west direction ($S_E$).

On the shaft 59 which is driven by the disk 57l of the component solver or integrator 57, there is mounted a gear 61 that meshes with a gear 62a forming one side of a differential 62. A gear 62b forming the other side of the differential 62 drives a gear 63 that is formed integral with a fly-wheel 64 and which is rotatably mounted on a fixed shaft 65. The center or spider of the differential has a counterweight 66 suspended from the lower end to balance the arm 67 extending from its upper end. The arrangement of differential 62 so far described is similar to the well known Weber dynamometer and produces a force upon the arm 67 proportional to the north and south component of the acceleration of the ship.

Figure 4:
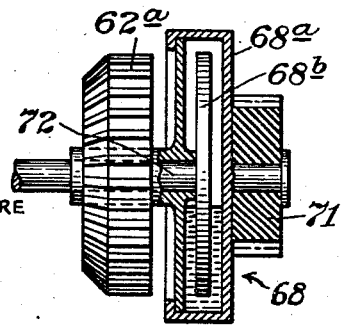
Fig. 4 is a longitudinal section of a viscous drag device.

To this force proportional to the north and south component of the acceleration of the ship, there is added a force proportional to the north and south component of the speed of the ship. This force is obtained by use of a viscous drag device 68. The viscous drag device is driven through a gear 69 mounted on the shaft 59 and meshing with an idler 70 which is also in mesh with a gear 71 formed integral with the case 68a of the drag device. The drag device (see Fig. 4) consists of the hollow case 68a partially filled with a viscous fluid such as oil and a disk 68b mounted within the case. The disk 68b is mounted on the end of a shaft 72 which extends through and is journaled in one side of the case and which is connected to the spider of the differential 62. Rotation of the case 68a of the viscous drag device exerts a force through the oil upon the disk 68b which force is proportional to the speed of rotation of the case. There is thus produced a force proportional to the north and south component of the speed of the ship and that force is algebraically added to the force proportional to the north and south component of the acceleration of the ship. The resultant force $F_N$ produced on the arm 67 is, therefore, a force equal to the algebraic sum of a force proportional to the first derivative and a force proportional to the second derivative of the north and south component of the distance traveled by the ship.

The disk 57m, through the shaft 60 operates a similar mechanism 72 to produce a force equal to the algebraic sum of a force proportional to the first derivative and a force proportional to the second derivative of the east and west component of the distance traveled by the ship. To this force there is added a force proportional to the cosine of the latitude of the ship, i. e., a force to provide for the rotation of the earth. This force is exerted through the differential 72a of the mechanism 72 through a rod 73 connected to the center or spider of the differential. To the free end of the rod or arm 73 there is connected one end of a spring 74 and the other end of the spring 74 is connected to a nut 75 mounted upon a screw shaft 76 and constrained against rotation therewith. The screw shaft 76 is formed integral with a shaft 77 that carries the crank 49. It will thus be observed that as the crank 49 is turned the nut 75 moves longitudinally of the screw shaft and increases or decreases the spring tension acting upon the arm 73. The dial 53 which is driven by shaft 77 is so calibrated that the force exerted on the spider of the differential is proportional to the cosine of the latitude. The resultant force $F_E$ acting upon the output arm 72b of the mechanism 72 is, therefore, equal to the algebraic sum of a force proportional to the east and west component of the speed of the ship, a force proportional to the east and west component of the acceleration of the ship and a force proportional to the cosine of the latitude of the ship.

The forces on the arms 67 and 72b, that is, the forces $F_N$ and $F_E$, are applied to a force analyzer or component solver denoted generally by the numeral 79 which resolves these forces into components about the axis X'—X' and Y'—Y', and generates hydraulic pressures proportional to such components which pressures are applied to the gyroscope as precessional forces through the control elements 20 and 21 in a manner disclosed in detail in the aforementioned application of Edward J. Poitras and James D. Tear. The force analyzer consists of two pressure regulators 80 and 81 that are identical in construction, one of which is shown in Fig. 3.

Force analyzer

Figure 3:
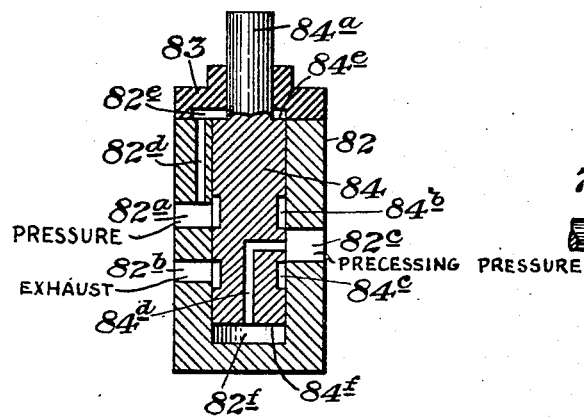
Fig. 3 is a longitudinal section of a hydraulic pressure generator.

The pressure regulators illustrated in Fig. 3 consist of a cup-shaped block 82, a cap 83 and a piston valve 84 within the block 82. The casing or block 82 has three ports, a pressure port 82a, an exhaust port 82b and a precessing pressure port 82c. A passage 82d connects the pressure port 82a and a pressure chamber 82e formed at the end of the valve by recessing the cap. The valve 84 is provided with a stem 84a that extends through a central opening in the cap 83. The body of the valve has two reduced sections 84b and 84c through which the pressure port, when the valve is moved downwardly, and the exhaust port when the valve is moved upwardly, are placed into communication with the port 82c. A passage 84d having two branches at right angles places the port 82c in communication with a chamber 82f formed in the bottom of the valve casing 82. The face 84e of the piston 84 is one half the area of the face 84f of the piston.

Oil under a constant pressure is delivered to the pressure port 82a and acts upon the face 84e of the piston. The port 82c and the passages connected therewith are filled with oil under a pressure of one-half the pressure in the port 82a when there is no external force acting on the valve, since the pressure of the oil on the face 84e of the piston 84 balances the pressure of the oil acting on the face 84f of the piston. Under these conditions no precessing force is applied to the gyroscope as the control element, which is acted upon by oil pressures from the ports 82a and 82c, is similarly balanced. If a downward external force is applied to the valve stem, the valve will be moved to open the pressure port 82a to the port 82c and the pressure in the port 82c will increase to balance this additional downward force, and thus the force on the control element of the gyroscope will increase in one direction. There will not, however, be any movement of the control element as the gyroscope precesses about an axis perpendicular to the axis about which the precessing force is applied. Similarly, if an upward force is placed upon the valve stem 84a, the valve 84 will move upwardly to place the exhaust port 82b into communication with the port 82c and the pressure in port 82c will decrease until this external force is balanced. This condition places a precessing force in the opposite direction on the control element connected to the ports 82a and 82c.

The pressure regulators 80 and 81 are so constructed and act in this manner. These pressure regulators are formed in the ends of the branches of a right angular block 85. The block 85 is secured on a rotatably mounted plate 86 with the line of intersection of the central longitudinal planes of the branches of the blocks coincidental with the center of rotation of the plate. The hydraulic connections to the pressure regulators through pipes, grooves in the shaft 86a on which the plate 86 is mounted, and passages formed in the shaft and block, are as indicated diagrammatically and in a manner well known in the art. The constant pressure pipe is indicated by a line 87, the exhaust by a line 88 and the pressure pipes to the control elements 21 and 20 by lines 89 and 90.

A three-arm bell crank lever having a vertical arm 91a, and two horizontal, mutually perpendicular arms 91b and 91c radiating from the lower end of the arm 91a is mounted in a universal or cardan mounting 92 on the block 85. The axis of the vertical arm 91a is coaxial with the axis of rotation of the plate 86 and the arms 91b and 91c extend to the valve stems of the pressure regulators 80 and 81 respectively. The forces acting upon the arms 67 and 72b are transmitted to the arm 91a of the bell crank lever by converging links 93 and 94 connected to the arm 91a at their point of convergence, the link 93 being pivotally connected to the arm 67 and the link 94 being pivotally connected to the arm 72b.

The forces acting upon the arms 67 and 72b are thus transmitted to the pressure regulators and these forces are resolved into components in accordance with the relative position of the pressure regulators. The table 86 is rotated in accordance with the true target bearing and so the forces acting on the pressure regulators are resolved into precessing pressures about the level and cross level axes. The table is rotated through a differential 95 to one side of which it is connected through a gear 96 formed on the table. The other side of the differential is driven by the shaft 47 through the connection 58a, and the shaft 46 rotates the spider of the differential. The table 86 is thus turned in accordance with the algebraic sum of the course angle of the ship and the bearing of the target relative to the ship; this represents the true target bearing.

When the gyroscopic mechanism is placed near the metacenter of the ship, the pressures generated in the pressure regulators 80 and 81 are applied to the gyroscope as the precessing pressures to compensate for the forces due to horizontal accelerations of the pendulums and compensate for the movement of the ship and the rotation of the earth. The gyroscope is thus a fully compensated vertical-seeking gyroscope and provides a horizontal plane that may be used to measure level and cross level angles or as an artificial horizon.

Roll compensator

Figure 2:
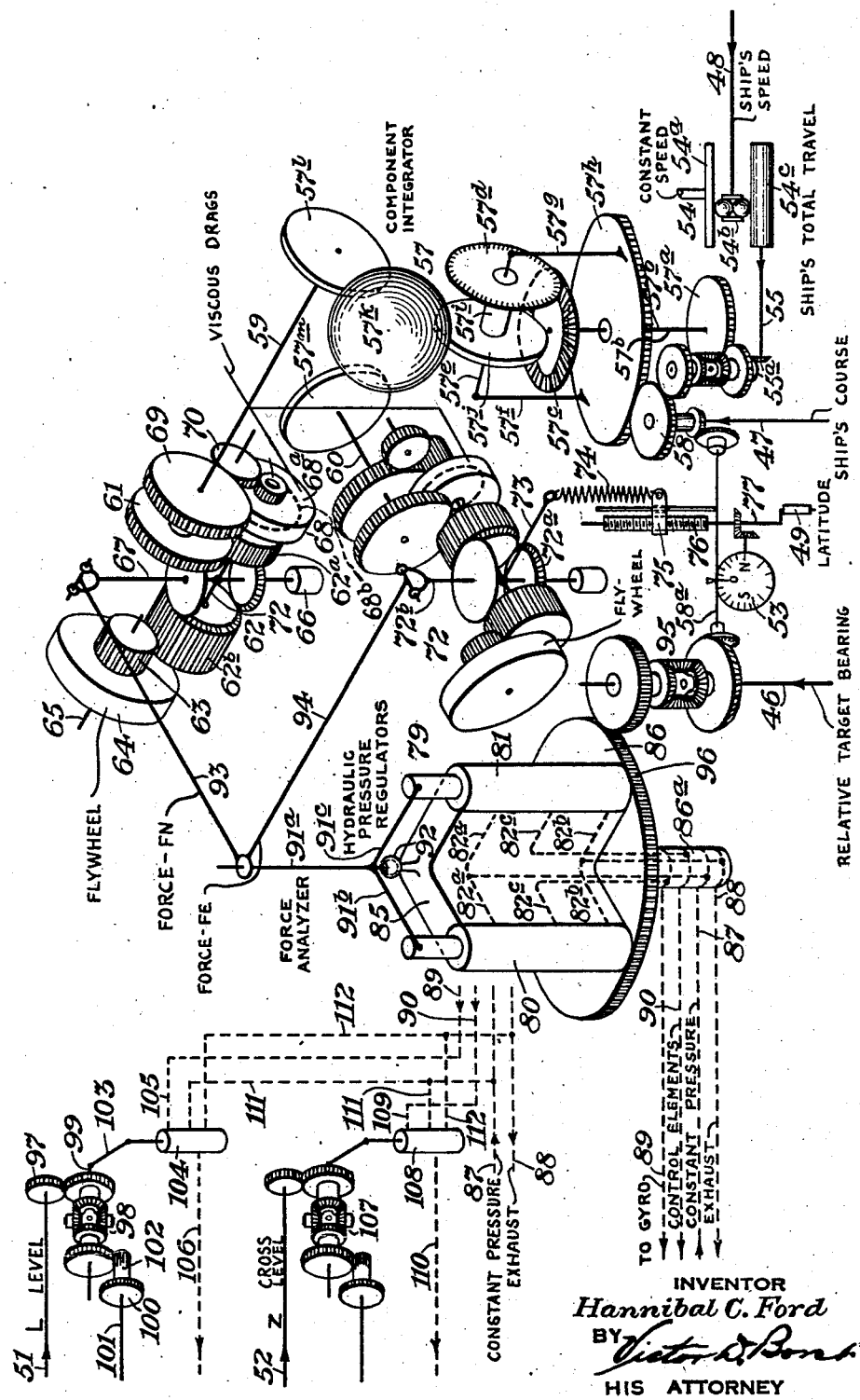
Fig. 2 is a diagrammatic representation of the computing and force generating mechanism.

In the event the gyroscopic mechanism is used at a considerable height above or below the metacenter of the ship, the horizontal accelerations due to moderate or large angles of roll must also be compensated if it be desired to prevent deviations of the stabilizer from vertical during each roll. In such an installation, the precessing pressures produced in the pressure regulators 80 and 81 are modified to compensate for these horizontal accelerations of roll, as shown in Fig. 2a.

For the purpose of compensating for this effect, the shaft 51 is geared to the shaft 25 and the shaft 52 is geared to the shaft 40. The shaft 51 is thus rotated in accordance with the level angle and the shaft 52 is rotated in accordance with the cross level angle. The shaft 51 carries a gear 97 on the end thereof which meshes with one side of a differential 98 mounted on a shaft 99. A fly wheel 100 mounted on a shaft 101 carries a pinion 102 that meshes with the other side of the differential. An arm 103 connects the center of the differential with the valve stem of a pressure booster 104. When this auxiliary apparatus is used the output 89 of the pressure regulator 80 is connected to the pressure booster by a line 105 and the booster 104 delivers pressure through a line 106 to the gyroscope control element 20. The pressure in the line 106 is modified from the pressure in the line 105 by an amount proportional to the force exerted on the booster through the arm 103 of the differential dynamometer 98 and this force is proportional to the horizontal accelerations acting on the pendulum 9 of the gyroscopic mechanism due to roll of the ship, that is, the angular movement of the ship about the Y'—Y' axis.

In a similar manner the shaft 52 actuates a dynamometer 107 which acts upon a pressure booster 108. The pressure line 90 from the regulator 81 is connected to the booster 108 by a line 109 and the booster is connected to the control element 21 by a line 110. The boosters are connected to the pressure line 87 by a line 111 and to the exhaust line 88 by a line 112.

Figure 5:
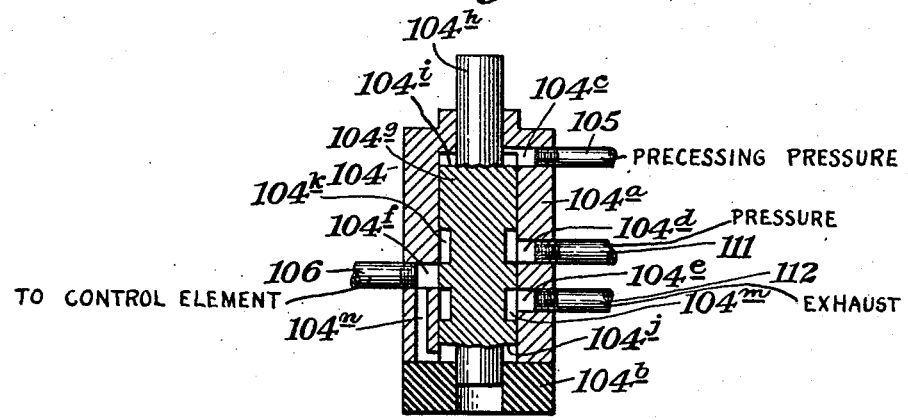
Fig. 5 is a longitudinal section of a pressure booster.

The pressure boosters 104 and 108 are identical in construction and the pressure booster 104 is shown in detail in Figure 5 and consists of a cylindrical valve case 104a having an opening through the upper end thereof and a cap 104b with an opening therethrough on the lower end. There are four ports to the valve case, a port 104c adjacent the top thereof to which the pipe line 105 is connected, a port 104d to which the pressure line 111 is connected, a port 104e to which the exhaust line 112 is connected, and a port 104f to which the line 106 leading to the gyroscope control is connected. Within the case 104a there is a piston valve 104g having a stem 104h extending through the top of the case and a reduced extension received in the opening in the cap. The end faces 104i and 104j of the valve form pressure surfaces and they are of equal area. Intermediate the ends of the valve and arranged for cooperation with the ports 104d, 104e and 104f the piston valve is reduced in diameter to form spaced circumferential grooves 104k and 104m.

The ports 104d, 104e and 104f are positioned such that if the valve is moved downwardly from the position shown, the pressure port 104d will be placed in communication with the port 104f and the pressure in this port is increased. If the valve is moved up from the position illustrated, the exhaust port 104e is placed in communication with the port 104f and the pressure in port 104f is decreased. The pressure in the line 105, that is, the pressure from the pressure regulator 80 is impressed on the upper end of the piston valve as the port 104c communicates with the chamber formed between the face 104i of the piston and the upper end of the valve case. The chamber formed between the pressure face 104j of the valve and the cap 104b is connected to the port 104f by a passage 104n so that the pressure of the oil in this port opposes the pressure of the oil in the port 104c. Consequently, if there is no external force acting upon the valve, the pressure in the port 104f will be equal to the pressure in the port 104c. When, however, an external force is applied to the valve this balance is disturbed and the pressure in the port 104f is opened to the pressure or exhaust port depending upon the direction of the applied force, to increase or decrease the pressure therein to balance this external force. The pressure in the port 104f, therefore, represents the algebraic sum of the pressure in the port 104c and a pressure proportional to the external force applied to the valve by the action of the dynamometer.

If it be desired to provide for manual adjustment of the gyroscope the forces may be applied through the boosters 104 and 108 either directly to the piston valves thereof or by any other means as by electromagnetic forces or hydraulically. In installations in which the boosters are not used manual control may be effected through the pressure regulators 80 and 81.

It is obvious that various other changes may be made by those skilled in the art in the details of the embodiment of the invention illustrated in the drawings and described in detail above within the principle and scope of the invention as expressed in the appended claims.

I claim:

1. In a gyro vertical for establishing a horizontal plane on a moving ship, the combination comprising a freely mounted gyroscope, means for producing and applying a vertical-seeking force to the gyroscope, and means for producing precessing forces on the gyroscope to compensate for the movement of the ship and the rotation of the earth including means for resolving the movement of the ship into components in the east and west and the north and south directions, means controlled by said resolving means for producing forces proportional to such components of the movement of the ship, and means for applying said proportional forces to the gyroscope.

2. In a gyro vertical for establishing a horizontal plane on a moving ship, the combination comprising a freely mounted gyroscope, means for producing and applying a vertical-seeking force to the gyroscope, and means for producing precessing forces on the gyroscope to compensate for the movement of the ship and the rotation of the earth including means for resolving the movement of the ship into components in the east and west and the north and south directions respectively, means controlled by the components so resolved for producing forces proportional to the speed of the ship and the acceleration of the ship along such respective components of the movement of the ship, and means for applying such forces as precessing forces to the gyroscope about its supporting axes.

3. In a gyro vertical for establishing a horizontal plane on a moving ship, the combination comprising a freely mounted gyroscope, means for producing and applying a vertical-seeking force to the gyroscope, and means for producing precessing forces on the gyroscope to compensate for the movement of the ship and the rotation of the earth including means for resolving the movement of the ship into components in the east and west and north and south directions respectively, means controlled by the components so resolved for respectively producing forces proportional and parallel to the speed of the ship and the acceleration of the ship along such components of the movement of the ship, means for producing a force proportional to the cosine of the latitude of the ship, means for adding the force proportional to the latitude of the ship to the forces proportional to the component of the movement of the ship in the east and west direction, and means for applying such forces as precessing forces to the gyroscope.

4. In a gyro vertical for establishing a horizontal plane on a moving ship, a platform rotatably mounted on the ship for movement in bearing with respect to the ship, a freely mounted gyroscope mounted on the platform, said gyroscope being suspended from two angularly disposed horizontal axes, means for producing a vertical-seeking force on the gyroscope, means for generating forces proportional to the movement of the ship, means for resolving such forces into components in the direction of the axes of suspension of the gyroscope, and means for applying these components as precessional forces to the gyroscope.

5. In a gyro vertical for establishing a horizontal plane on a moving ship, a platform rotatably mounted on the ship for movement in bearing with respect to the ship, a gyroscope mounted on the platform for movement about two mutually perpendicular horizontal axes, means for producing a vertical-seeking precessional force on the gyroscope, and means for producing precessing forces on the gyroscope to compensate for the movement of the ship and the rotation of the earth including means for resolving the movement of the ship into components in the east and west and north and south directions, means controlled by said resolving means for producing forces proportional to such components of the movement of the ship respectively, means for resolving such forces into components in the direction of the axes about which the gyroscope is mounted, and means for applying the components to the gyroscope.

6. In a gyro vertical for establishing a horizontal plane on a moving ship, a platform rotatably mounted on the ship for movement in bearing with respect to the ship, a gyroscope mounted on the platform for movement about two mutually perpendicular horizontal axes, means for producing a vertical-seeking precessional force on the gyroscope, and means for producing precessing forces on the gyroscope to compensate for the movement of the ship and the rotation of the earth including means for resolving the movement of the ship into components in the east and west and the north and south directions, means controlled by said resolving means for producing forces respectively proportional to such components of the movement of the ship, means for producing a force proportional to the cosine of the latitude of the ship and means included in said east and west force producing means for adding such force to the force proportional to the east and west component of the movement of the ship, means for resolving such forces into components in the direction of the axes about which the gyroscope is mounted, and means for applying the components to the gyroscope.

7. In a gyro vertical for establishing a horizontal plane on a moving ship, the combination comprising a freely mounted gyroscope, a pair of pendulums for producing a vertical-seeking force on the gyroscope, means for producing precessing forces to compensate for the movement of the ship and the rotation of the earth, means for producing forces proportional to the accelerations of the roll and pitch of the ship, and means for applying such forces to the gyroscope.

8. In a gyro vertical for establishing a horizontal plane on a moving ship, a platform rotatably mounted on the ship for movement in bearing with respect to the ship, a gyroscope mounted on the platform for movement about two mutually perpendicular horizontal axes, means for producing a vertical-seeking precessional force on the gyroscope, and means for producing precessing forces on the gyroscope to compensate for the movement of the ship and the rotation of the earth including means for resolving the movement of the ship into components in the east and west and north and south directions, means controlled by said resolving means for producing forces respectively proportional to such components of the movement of the ship, means for resolving such forces into components in the direction of the axis about which the gyroscope is mounted, means for producing forces proportional to the components of the acceleration of the roll and pitch of the ship in the derection of the axis about which the gyroscope is mounted, means included in said east and west force producing means for adding such forces to the aforesaid forces, and means for applying the components to the gyroscope.

9. In a gyro vertical for establishing a horizontal plane on a moving ship, a platform rotatably mounted on the ship for movement in bearing with respect to the ship, a gyroscope mounted on the platform for movement about two mutually perpendicular horizontal axes, means for producing a vertical-seeking precessional force on the gyroscope, and means for producing precessing forces on the gyroscope to compensate for the movement of the ship and the rotation of the earth including means for resolving the movement of the ship into components in the east and west and north and south directions, means controlled by said resolving means for producing forces respectively proportional to such components of the movement of the ship, means for producing a force proportional to the cosine of the latitude of the ship and means included in said east and west force producing means for adding such force to the force proportional to the east and west component of the movement of the ship, means for resolving such forces into components in the direction of the axes about which the gyroscope is mounted, means for producing forces proportional to the components of the linear acceleration of the pendulums due to the roll and pitch of the ship in the direction of the axes about which the gyroscope is mounted, means for adding such forces to the aforesaid forces, and means for applying the components to the gyroscope.

10. In a gyro vertical for establishing a horizontal plane on a moving ship, a platform rotatably mounted on the ship for movement in bearing with respect to the ship, a gyroscope mounted on the platform for movement about two mutually perpendicular horizontal axes, means for producing a vertical-seeking precessional force on the gyroscope, and means for producing precessing forces on the gyroscope to compensate for the movement of the ship and the rotation of the earth including means for resolving the movement of the ship into components in the east and west and north and south directions, means controlled by said resolving means for producing forces respectively proportional to such components of the movement of the ship, means for resolving such forces into hydraulic pressure components in the direction of the axes about which the gyroscope is mounted, and means for applying said hydraulic pressure components to the gyroscope.

11. The invention as set forth in claim 10 in which the means for applying the hydraulic pressure components to the gyroscope includes means responsive to said hydraulic pressure components and an operable connection between said pressure responsive means and said gyroscope.

12. The invention as set forth in claim 10 in which the means for applying the hydraulic pressure components include a piston responsive to said hydraulic pressure components and means for operably connecting said piston to the gyroscope.

13. In a gyro vertical for establishing a horizontal plane on a moving ship, the combination of a freely mounted gyroscope, means for producing a vertical-seeking force on the gyroscope, means for producing precessing forces on the gyroscope to compensate for the movement of the ship and the rotation of the earth including means for resolving the movement of the ship into components in the east and west and the north and south directions respectively, means controlled by said resolving means for producing forces proportional and parallel to the speed of the ship and the acceleration of the ship along such respective components of the movement of the ship, means for applying such forces to the gyroscope to effect precession and a follow-up mechanism for reproducing the precessing movement of the gyroscope relative to its support.

14. A gyro vertical for establishing a horizontal plane on a moving ship, comprising a freely mounted gyroscope, means for applying a vertical-seeking force to the gyroscope, means to resolve into rectangular components the movement of the ship with respect to the earth, means producing corrective precessional forces proportional to the first and second derivatives of said components, and means controlled by said resolving means for applying said corrective precessional forces to the gyroscope.

15. A device as set forth in claim 14 wherein said force applying means includes means for producing forces respectively proportional to the first and second derivatives of said components of the movement of the ship, means for resolving such forces into hydraulic pressure components in the direction of the axes about which the gyroscope is movable, and means for applying said hydraulic pressure components to the gyroscope.

16. A gyro vertical for establishing a horizontal plane on a moving ship, comprising a freely mounted gyroscope, means for applying a vertical-seeking force to the gyroscope, means to resolve into rectangular components the movement of the ship with respect to the earth, means producing corrective precessional forces proportional to the first and second derivatives of said components, means controlled by said resolving means for applying said corrective precessional forces to the gyroscope and follow-up mechanism for reproducing relative movement of the gyroscope with respect to its support.

HANNIBAL C. FORD.

REFERENCES CITED

The following references are of record in the file of this patent:

UNITED STATES PATENTS

| Number | Name | Date |
|---|---|---|
| 1,984,874 | Gillmor et al. | Dec. 18, 1934 |
| 2,093,503 | Wittkuhns et al. | Sept. 21, 1937 |
| 2,041,526 | Carter | May 19, 1936 |